United States Patent
Mitchell et al.

(10) Patent No.: US 12,115,535 B1
(45) Date of Patent: Oct. 15, 2024

(54) METHODS AND SYSTEMS FOR REDUCING TURBIDITY OF HYDRAULIC FRACTURING SANDS

(71) Applicant: Propflow, LLC, Little Rock, AR (US)

(72) Inventors: Jeremy Britt Mitchell, Little Rock, AR (US); Christopher Shane Martin, Wooster, AR (US)

(73) Assignee: Propflow, LLC, Little Rock, AR (US)

( * ) Notice: Subject to any disclaimer, the term of this patent is extended or adjusted under 35 U.S.C. 154(b) by 0 days.

(21) Appl. No.: 18/592,073

(22) Filed: Feb. 29, 2024

Related U.S. Application Data

(60) Provisional application No. 63/557,578, filed on Feb. 25, 2024.

(51) Int. Cl.
| | |
|---|---|
| *E02F 1/00* | (2006.01) |
| *B03B 5/60* | (2006.01) |
| *B03B 11/00* | (2006.01) |
| *B65G 15/30* | (2006.01) |

(52) U.S. Cl.
CPC ............ *B03B 5/60* (2013.01); *B03B 11/00* (2013.01); *B65G 15/30* (2013.01); *E02F 1/00* (2013.01); *B65G 2201/045* (2013.01)

(58) Field of Classification Search
CPC . B03B 5/60; B03B 11/00; B65G 15/30; E02F 1/00
USPC .......................................................... 209/452
See application file for complete search history.

(56) References Cited

U.S. PATENT DOCUMENTS

| | | | | |
|---|---|---|---|---|
| 4,832,853 | A * | 5/1989 | Shiraki ................ | B04B 3/00 210/360.2 |
| 10,316,243 | B2 * | 6/2019 | Hook .................... | C09K 8/805 |
| 11,465,155 | B1 * | 10/2022 | Mitchell ............... | B03B 11/00 |
| 11,896,833 | B2 * | 2/2024 | Abouelsoud ........ | A61N 1/36139 |
| 11,913,320 | B1 * | 2/2024 | Byman Johnson ... | C02F 11/127 |
| 2006/0006114 | A1 * | 1/2006 | Deskins ................ | B01D 21/02 210/793 |
| 2016/0024360 | A1 * | 1/2016 | Bestaoui-Spurr ...... | C09K 8/805 427/221 |
| 2016/0101428 | A1 * | 4/2016 | Convery ............... | B03B 5/48 209/3 |
| 2020/0223346 | A1 * | 7/2020 | Welch ................. | B65D 88/129 |
| 2020/0385955 | A1 * | 12/2020 | Morris ................. | E02D 3/00 |

FOREIGN PATENT DOCUMENTS

CN           109477366 A  *  3/2019  ............. C04B 26/14

OTHER PUBLICATIONS

McLanahan, Log Washers, https://www.mclanahan.com/products/log-washers.

* cited by examiner

*Primary Examiner* — Terrell H Matthews
(74) *Attorney, Agent, or Firm* — McAughan Deaver PLLC

(57) ABSTRACT

A method for reducing the turbidity of as-mined sand comprising adding water to the as-mined sand to increase its moisture content to between about 5% and about 40% by weight, mixing the sand and water, piling the wet sand on the ground, allowing the sand to rest for a predetermined period of between about 12 hours and about 3 days, then harvesting less than all of the sand from the pile as reduced turbidity sand.

20 Claims, 4 Drawing Sheets

METHODS AND SYSTEMS FOR REDUCING TURBIDITY OF HYDRAULIC FRACTURING SANDS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The present inventions relate to methods and systems for reducing particulate contaminates (i.e., turbidity) in as-mined sands used in forming hydraulic fracturing proppant slurries.

Description of the Related Art. When hydraulically fracturing a subterranean hydrocarbon formation (hereafter "fracking"), properly sized and cleaned, such as screened, proppant is blended at the wellsite with fluids and chemicals specific to a particular subterranean formation to create a proppant slurry that is then injected or pumped into the wellbore and surrounding formation. The first formation fracturing operation was reportedly done in 1947 with silica sand as the proppant. Since then, many materials have been used as proppants including walnut hulls, natural sand, glass, resin coated sand, sintered bauxite and kaolin, and fused zirconia. Today, hydraulic fracking is used in approximately 95 percent of oil and gas wells in the United States, and sand and ceramic proppants are the two most commonly used proppants.

Generally today, sand is not used as a proppant in its as-mined condition without some amount of processing. Proppant sand processing includes some or all of: mining sand deposits, crushing, washing/cleaning, drying, and/or sizing the sand grains. Indeed, American Petroleum Institute's Recommended Practice 19C (API RP 19C) is entitled "Measurement of Properties of Proppants Used in Hydraulic Fracturing and Gravel-packing Operations" and sets forth standards and specifications for sand as a proppant. For example, API RP 19C recommends that the turbidity of proppant sand be 250 FTU (Formazin Turbidity Units) or less measured using a turbidimeter. The specifications and requirements of API 19C are incorporated herein by reference.

Turbidity is the measure of suspended particles, such as clay or silt, in distilled water. The API turbidity proppant sand spec is essentially an indication of how "dirty" the sand is. Turbidity is measured by the amount of light that is scattered by material, other than the proppant, in the water when incident light is shined through the water sample. The scattered light is captured by a photodiode, which produces an electronic signal that can be converted to a turbidity measurement. The higher the intensity of scattered light, the higher the turbidity. Turbidity is a very complex analytical measurement and there are numerous test protocols other than the Formazin test protocol reported as FTUs, including NTU (Nephelometric Turbidity Units) and FNU (Formazin Nephelometric Units). Generally speaking, turbidity is not an absolute property and depends on the test method.

Materials that cause turbidity include clay, silt, inorganic and organic matter, algae, dissolved colored organic compounds, and plankton and other microscopic organisms. While some suspended solids will be large enough and heavy enough to settle rapidly to the bottom of the container (the settling solids), small particles will settle slowly or not at all if the particles are colloidal, or the sample is agitated.

While API recommends a turbidity for proppant sand of 250 FTU or less, it has been our experience that many well operators, including those in the Permian Basin of North America, will use proppant sands that have turbidities of 750 FTU and higher, including up to about 3,000 FTU. While a more thorough or additional washing process could reduce turbidity, conventional sand washing processes already use thousands of gallons of water per ton of sand and lose or waste hundreds of gallons of water.

The present inventions provide methods and systems for reducing the turbidity of as-mined frack sand using and wasting much less water than conventional proppant sand processing.

It is to be understood that the discussion above is provided for illustrative purposes only and is not intended to and does not limit the scope or subject matter of the appended or ultimately issued claims or those of any related patent application or patent. Thus, none of the appended claims, ultimately issued claims or claims of any related application or patent are to be limited by the above discussion or construed to address, include, or exclude each or any of the above-cited features or disadvantages merely because such were mentioned herein.

BRIEF SUMMARY OF THE INVENTION

A non-limiting and brief summary of the inventions disclosed herein may be a method of reducing the turbidity of as-mined sand, comprising the steps of mining sand having an as-mined turbidity of more than 250 FTU or its equivalent; wetting the as-mined sand with water having a turbidity of at least half of the as-mined turbidity of the sand; creating a pile of the wetted sand; allowing the pile of wetted sand to rest for a predetermined period of more than 24 hours; harvesting after the predetermined period a portion of the sand from the pile, the harvested sand having a turbidity less than the turbidity of the as-mined sand.

This brief summary of the inventions is not intended to limit or otherwise affect the scope of what has been disclosed and enabled or the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the disclosure of inventions and are included to demonstrate further certain aspects of the inventions. The inventions may be better understood by reference to one or more of these figures in combination with the detailed description of certain embodiments presented herein.

Figure 1:
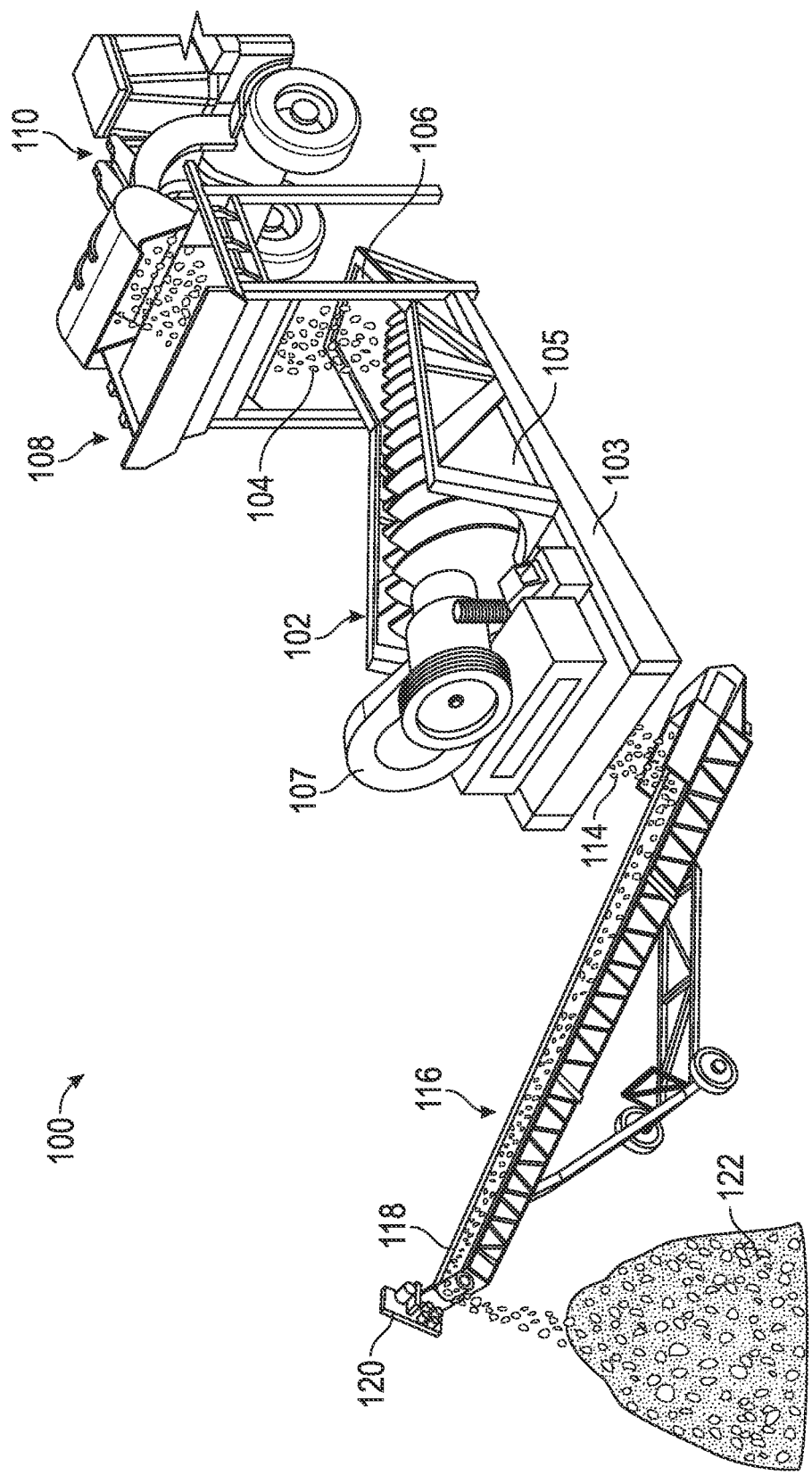
FIG. 1 illustrates a preferred embodiment of the many possible embodiments of our inventions.

While the inventions disclosed herein are susceptible to various modifications and alternative forms, only a few specific embodiments have been shown by way of example in the drawings and are described in more detail below. The figures and detailed descriptions of these embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts illustrated and taught by the specific embodiments.

DETAILED DESCRIPTION

The Figures described above, and the written description of specific structures and functions below, are not presented to limit the scope of the inventions disclosed or the scope of the appended claims. Rather, the Figures and written description are provided to teach a person skilled in this art to make and use the inventions for which patent protection is sought.

A person of skill in this art that has benefit of this disclosure will understand that the inventions are disclosed and taught herein by reference to specific embodiments, and that these specific embodiments are susceptible to numerous and various modifications and alternative forms without departing from the inventions we possess. For example, and not limitation, a person of skill in this art that has benefit of this disclosure will understand that Figures and/or embodiments that use one or more common structures or elements, such as a structure or an element identified by a common reference number, are linked together for all purposes of supporting and enabling our inventions, and that such individual Figures or embodiments are not disparate disclosures. A person of skill in this art that has benefit of this disclosure immediately will recognize and understand the various other embodiments of our inventions having one or more of the structures or elements illustrated and/or described in the various linked embodiments. In other words, not all possible embodiments of our inventions are described or illustrated in this application, and one or more of the claims to our inventions may not be directed to a specific, disclosed example. Nonetheless, a person of skill in this art having benefitted from this disclosure will understand that the claims are fully supported by the entirety of this disclosure.

Those persons skilled in this art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art that have benefited from of this disclosure.

Further, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the scope of what is claimed.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In general terms, our inventions comprise one or more of: mining sand, including surface sand and sub-surface sand. Mixing the sand with a controlled amount of water, which amount is preferably less than about 100 gallons of water per ton of sand, more preferable between about 40 gallons per ton of sand to about 60 gallons per ton and most preferably about 20 gallons per ton or less, to suspend contaminating solids in the water and to wet individual sand grains. As shown in the chart below, the amount of water added to a ton of sand (2,000 lbs) will raise the moisture content of as-mined sand (assuming a density of 8.33 lbs/gal).

| Amount of Water Added (gals) | Weight of water Added (lbs) | Percentage Added Moisture Content by Weight |
|---|---|---|
| 100 | 833 | 42 |
| 80 | 666 | 33 |
| 60 | 500 | 25 |
| 40 | 333 | 17 |
| 20 | 167 | 8 |
| 15 | 125 | 6 |
| 10 | 83 | 4 |

It is to be noted that the moisture content of the as-mined sand will not be 0% by weight and most likely will be around 1% to 5% by weight depending on various environmental factors. The water added to the as-mined sand will raise the moisture content above the as-mined condition. In a preferred embodiment of our inventions, the amount of water added will be less than the amount needed to create a slurry. For purposes of this disclosure, a "sand slurry" comprises at least 500 gallons of water per ton of sand (~200% moisture by weight).

The wetted sand may be deposited, preferably on the ground, in one or more piles. Optionally, a portion of the water added to the as-mined sand may be extracted, such as by draining, prior to forming the pile of sand. The water in the sand pile is allowed to migrate downward through the pile toward the ground over a predetermined period, such as 12 hours to 4 days, thereby removing solid contaminants from at least a portion of the sand pile thereby reducing the turbidity of that portion of the sand pile. Thereafter, at least a portion of the sand pile with reduced turbidity, such as up to about 90% of the pile, may be harvested or collected. The harvested, lower turbidity sand may then be transported to a wellsite without artificially drying or otherwise processing the harvested sand. A hydraulic fracturing fluid may be created at the wellsite from the reduced turbidity sand and the formation may be fractured with the hydraulic fracturing fluid. Optionally, our inventions may comprise screening the as-mined sand prior to or after adding water to remove non-sand debris or contaminants.

Further, the turbidity reducing process of our inventions may be repeated to further reduce the turbidity of the harvested or collected sand. For example, after a pile of sand has been processed as described above, a portion, such as an upper portion, of the pile may be harvested and run through the process again (or multiple times) to further reduce the turbidity of at least a portion of the sand.

It will be appreciated that our inventions do not necessarily reduce the turbidity of the entire pile of processed sand, which is in direct contrast to a conventional sand washing process in which all of the processed is washed, but which requires hundreds if not thousands of gallons of water per ton of sand.

Turning now to the Figures, which illustrate one or more particular embodiments incorporating one or more aspects of our inventions, FIG. 1 illustrates a first system or process 100 comprising a washing station 102, such as a modified, conventional log washer, such as those available from McLanahan, and others. into which as-mined sand 104 may be deposited into an inlet 106 along with a volume of water based on the amount of sand. The water may be fresh water or produced water. A key factor in selecting the water to be used is that the water should have a turbidity less than the desired turbidity of the processed sand 114. More specifically, the water preferably should have a turbidity of less than half, and more preferably less than one-quarter of the target sand turbidity. For example, if the desired sand 108 turbidity is 500 FTU, the water turbidity should be 250 FTU or less or most preferably 125 FTU or less. Most preferably, our inventions use fresh water with turbidities of less than 50 FTU. In general, drinking water has turbidities of 1.0 FTU or less and fresh water from natural environments ranges from about 2 FTU to about 20 FTU.

The amount of water used with the washing station 102 may vary, but preferably the amount of water is between about 10 gallons of water per ton of sand to about 100 gallons per ton of sand. Most preferably, about 20 to about 50 gallons of water are used per ton of sand. This is contrasted with conventional proppant sand washing processes, which typically use upwards of about 500 gallons of water, including around 1,000 gallons of water per ton of sand.

As illustrated in FIG. 1, as-mined sand 104 may be deposited into a hopper 108 by a bucket loader 110 or other material handler, such that the hooper 108 feeds as-mined sand 104 to the inlet 106 of the washing station 102. A portion 110 of the water added to the washing station 102 may be allowed, but is not required, to exit or overflow the washer 102. Such overflow, if allowed, should contain solid contaminants that added to the original turbidity of the as-mined sand 104. The overflow can be allowed to spill on to the ground. Optionally, the overflow may be contained and further processed or disposed as allowed or required. It is preferred that the amount of water added wets the sand without excess water that could be discharged from the washing station 102. It is preferred that the water added to the washing station 102 is retained by the as-mined sand 104, such that the moisture content of the sand 114 exiting the washing station 102 is between about 5% and 20% by weight, or up to about 40% by weight.

The washing station 102 preferably contains an agitation system 112, such as motorized augers or rotating paddles, configured and structured to agitate and mix the sand and water and, transport the wet sand to a discharge end of the washing station 102. As the wetted sand 114 exits the washing station, it may be deposited on a belt conveyor 116 comprising a moving belt 118 and a drive assembly 120. The conveyor 116 is positioned (such as located and elevated) to create a pile 122 of wet sand 114, preferably on the ground.

Once the wetted sand 114 is piled on the ground, the pile 122 is allowed to rest for a predetermined period, such as 12 hours to 4 days or any period in between, or more, to allow the water in the wetted sand 114 to migrate or drain toward the bottom of the pile 108. Migration of water through the sand pile 122 will remove additional solid contaminants from the upper portions of the pile 122 further reducing the turbidity of that portion of the sand pile 122.

It is preferred that the pile 122 of wet sand 114 not be disturbed during the period in which the water within the pile 122 is allowed to reduce the turbidity of the sand 114. By "disturbed," we mean any external action that would adversely affect turbidity reduction as required herein. Additionally, in a preferred embodiment, a cover 124 (see FIG. 2) is placed or draped over at least an upper portion of the sand pile 122 to reduce moisture loss from the pile during the rest period. For example, if the rest period for a pile of processed sand is determined to be 72 hours, a cover may be placed over the pile or at least a portion of the pile beginning at time 0 hours (TO) and removed at time 72 hours (T72). Alternately, the cover may be placed over the pile or at least a portion of the pile beginning at time 0 hours (TO) and removed at time 36 hours (T36), and a portion of the pile harvested at time 72 hours. It will be appreciated that covering the pile may comprise the cover contacting the sand 114 or being suspended from and not contacting the sand 114. It will also be appreciated that covering the sand 114 may actually increase the moisture content of the pile, such as through natural condensation processes.

Figure 2:
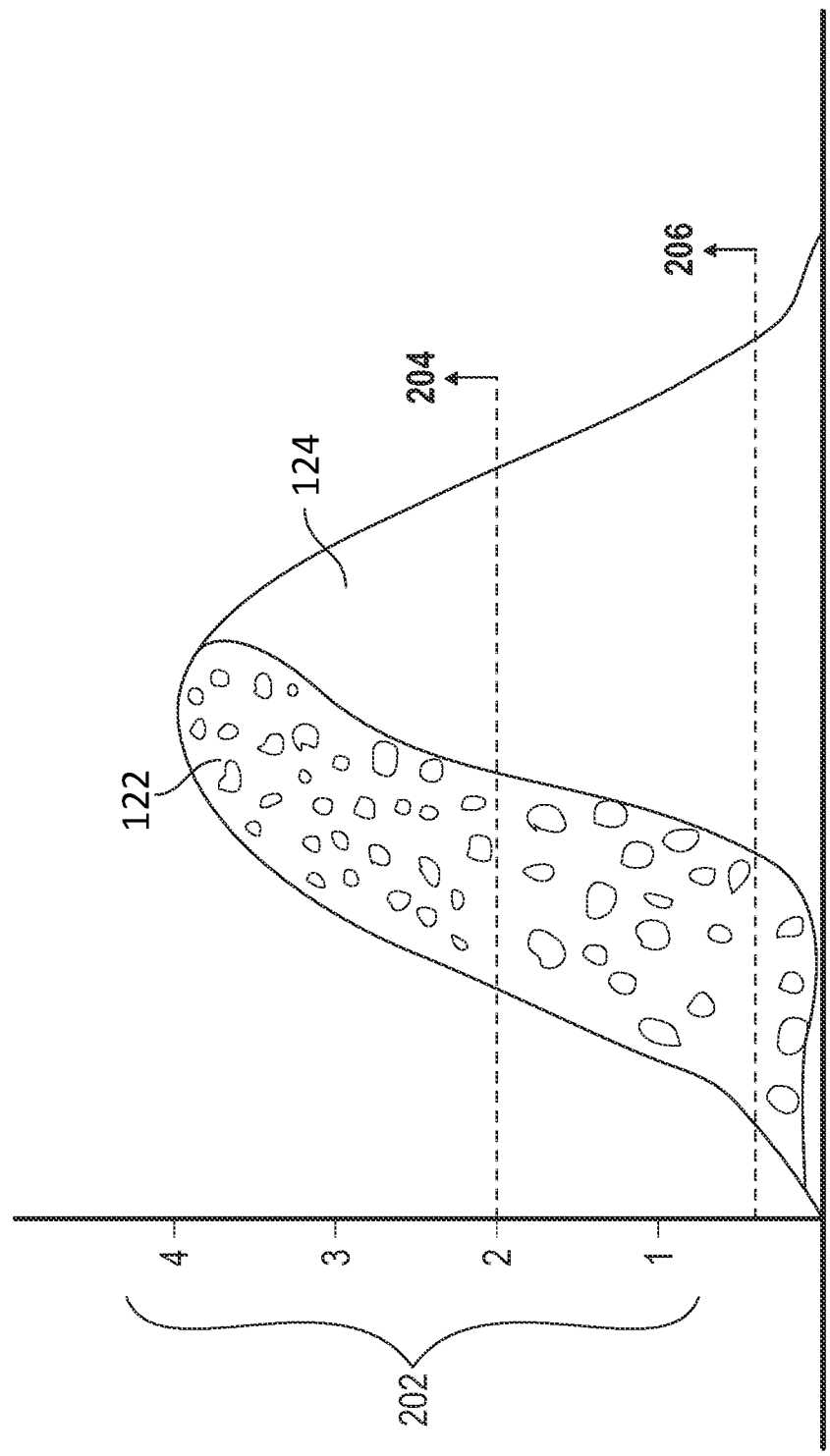
FIG. 2 illustrates a pile of frack sand processed by our inventions.

As illustrated in FIG. 2, the pile of wetted sand 122 can be considered as having one or more vertical portions or sections 202. For example, the pile 122 can be divided into to, for example, four vertical portions 1 through 4. After the predetermined period, such as 2 days, the upper half 204 of the pile 122 (i.e., portions 3 and 4) can be harvested, such as by a bucket loader or other material handling system (not shown) and thereafter used to create hydraulic fracturing fluid for a hydraulic fracturing operation or re-processed through the washing station 102 to further reduce the turbidity of the sand. Alternately, larger portions of the pile 122, such as the upper 90% portion 206 may be harvested for use or reprocessing as described above.

Additionally, if an upper portion 204, 206 of the pile 122 is used for creating a hydraulic fracturing fluid, the lower or unharvested portions of the pile 122 can be re-processed as described above.

Figure 3:
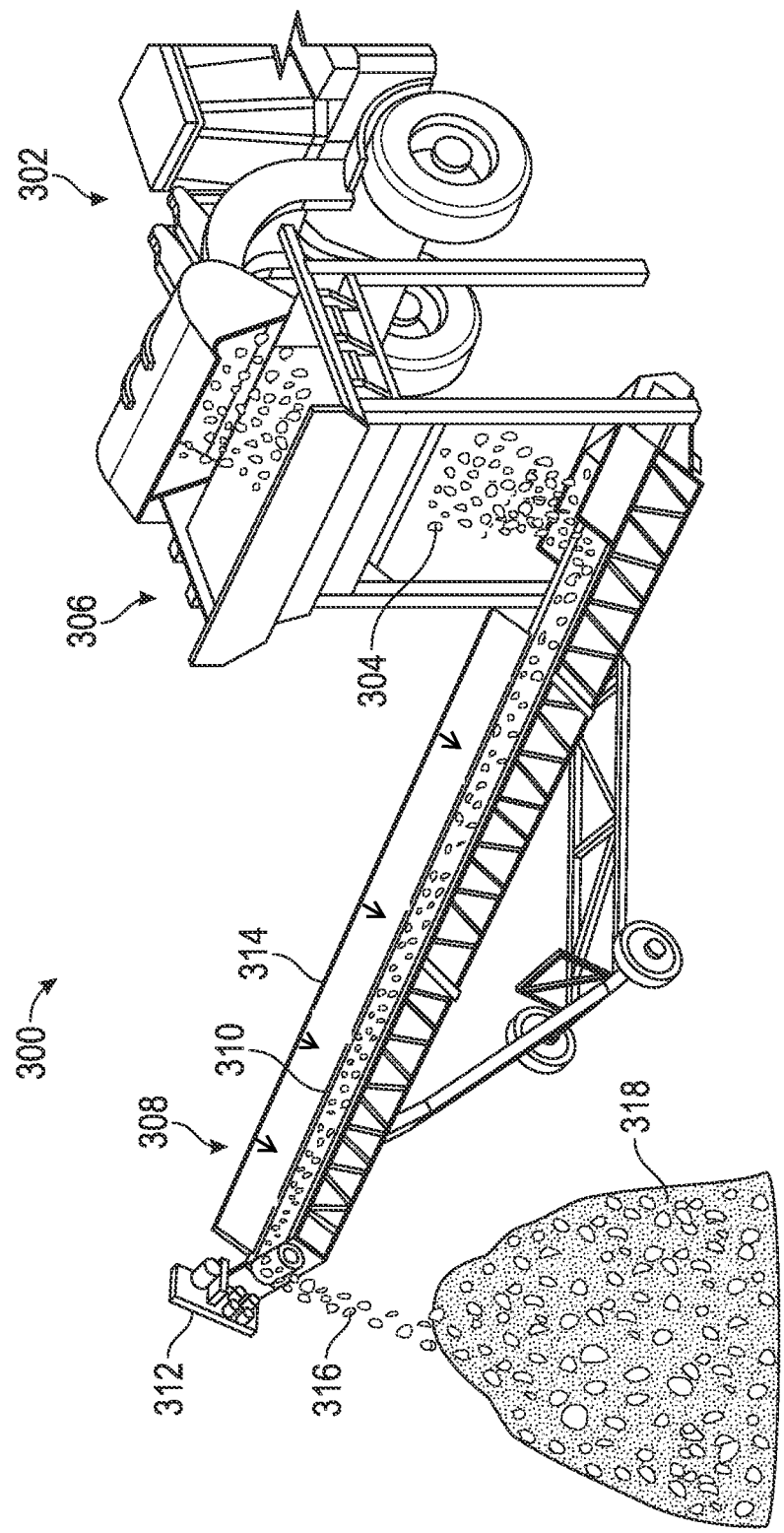
FIG. 3 illustrates another embodiment of our inventions.

FIG. 3. Illustrates another embodiment 300 incorporating our inventions in which a bucket loader 302 loads as-mined sand 304 into a hopper 306. The hopper 306 may feed the sand 304 to the inlet of a belt conveyor 308 comprising a moving belt 310 for transporting the sand 304 and a drive assembly 312. The conveyor 308 may be modified to include a watering system 314, such as a spray bar system, to apply water to the sand 304 on the belt 310, in amounts sufficient to increase the water content of the sand on the conveyor to between about 5% and about 20% by weight, or up to about 40% by weight. The wetted sand 316 can exit the conveyor 308 to create a pile 318 of wetted sand 316 as described above, including covering the pile.

It will be appreciated that the belts 118, 310 described above may comprise moisture impermeable materials, moisture permeable materials, or a combination of both. For example, belt 118, 310 may comprise a dewatering screen or belt that allows water, such as about 5% moisture by weight, and turbidity contaminants, to pass through, but not desired proppant.

Figure 4:
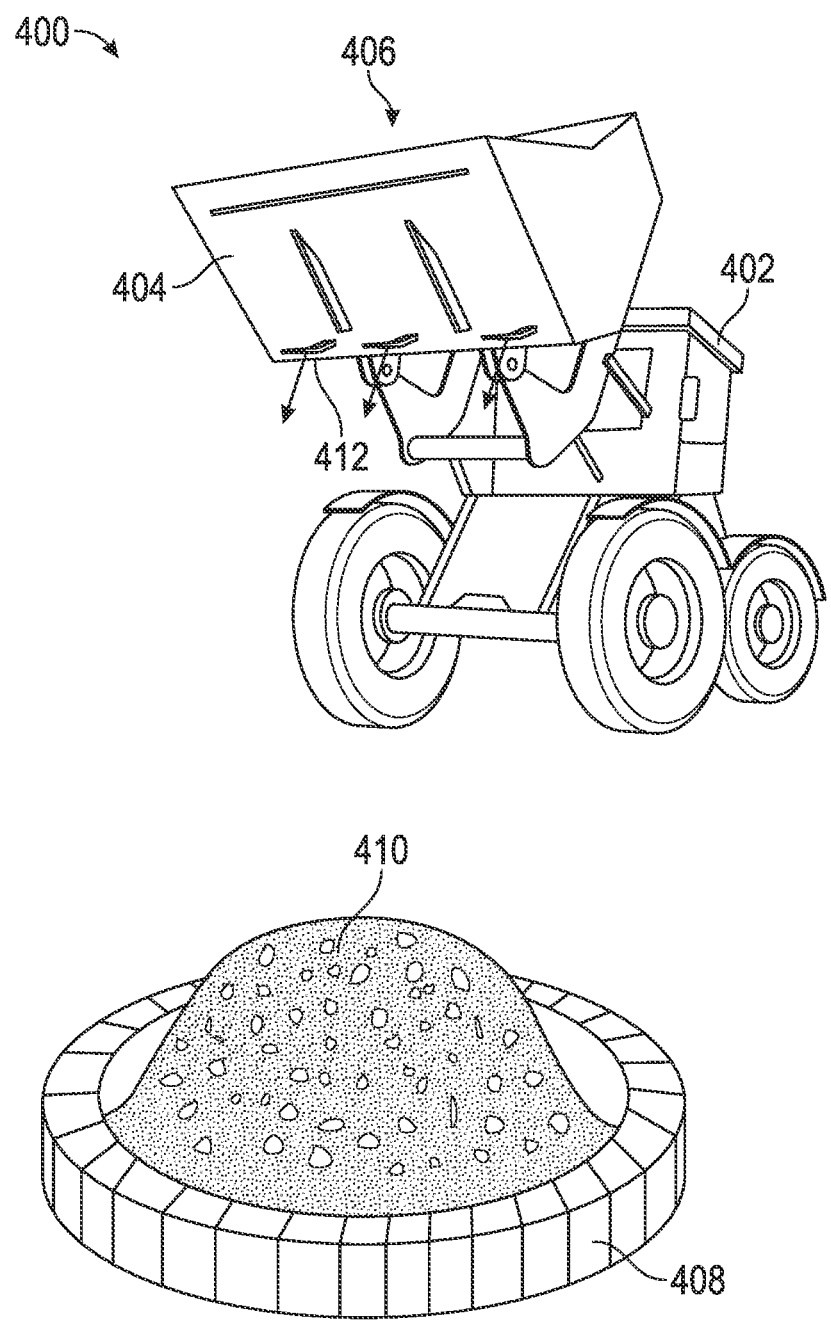
FIG. 4 illustrates yet another embodiment of our inventions.

Other embodiments of our inventions may include, without limitation, simply piling as-mined sand on the ground, adding water to the pile, such as fresh water or produced water as described above, and allowing the added water to drain to the bottom of the pile so that the added water reduces the turbidity of at least a portion of the sand in the pile. For example, and not limitation, FIG. 4 illustrates another process 400 in which a front end loader 402 scoops as-mined sand in its bucket 404 to which a controlled or known amount of water 406 is added. As an example, if the bucket 404 is 4 cubic yards in capacity, 4 tons of sand (about 3.3 yd$^3$) can be easily scooped to which about 40 to about 240 gallons of water 406 can be added to raise the moisture content to between about 5% to 20%, or up to about 40%. The front end loader 402 can transport the wet sand in the bucket 404 to a location (such as at the mine) where the wet sand in the bucket 304 can be piled on the ground. It will be appreciated that transporting the wet sand in the bucket 404 can agitate the sand and water to fully wet the sand grains.

As illustrated in FIG. 4, the location at which the wet sand is piled (regardless of the sand is processed) may comprise a sand retaining structure 408, which may or may not be porous to water. One or more buckets 404 of wet sand may be added to the pile 410, as desired. As discussed above, the pile 410, which may or may not be covered, is allowed to rest, undisturbed, for a predetermined period to allow the water in the pile 410 to migrate downward and remove turbidity-producing contaminants from at least a portion of the pile 310, as discussed with respect to FIG. 2.

Alternately or additionally the bucket 404 may be modified such as by providing one or more drains holes 412, such as at or near the bottom of the bucket 404, to allow some of the water 406 to drain from the bucket during transport, preferably along with turbidity-producing contaminants before creating pile 410.

For all of the embodiments described herein, additional equipment and components may be required or desired to achieve the described results, including weight transducing devices, such as load cells or belt scales, arranged and configured to determine an amount of sand; fluid flow meters arranged and configured to determine an amount of water provided to the sand (such as in the washing station 102, the conveyor 308 or the pile 410), turbidity meters or test stations, and/or sand moisture meters arranged and configured to determine the moisture content of the wet sand at one or more points along the process, along with necessary power, plumbing and communication systems.

The sand processed by our inventions and enabled herein may be used with our other inventions, including those disclosed and/or claimed in U.S. Pat. Nos. 11,465,155 and 11,896,983, the contents of which are incorporated herein by reference for all purposes. Our inventions may be implemented at the sand mine location or at the wellsite, or at other locations. If implemented at other than the wellsite, such as the sand mine, it is preferred that the processed sand be transported to the wellsite without artificially drying the processed sand to reduce its transportation weight. Of course, in some circumstances it may be economically necessary to first dry the processed sand before transporting.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed:

1. A method of reducing the turbidity of as-mined sand, comprising the steps of:
    mining sand having an as-mined turbidity of more than 250 FTU or its equivalent;
    wetting the as-mined sand with water having a turbidity of at least half of the as-mined turbidity of the sand;
    creating a pile of the wetted sand;
    allowing the pile of wetted sand to rest for a predetermined period of more than 24 hours;
    harvesting after the predetermined period a portion of the sand from the pile, the harvested sand having a turbidity less than the turbidity of the as-mined sand.

2. The method of claim 1 comprising wherein wetting the as-mined sand comprises raising the moisture content of the sand to between about 5% and about 40% by weight.

3. The method of claim 2, comprising providing a sand washing assembly having a body for containing the as-mined sand long with a predetermined volume of water, the sand washing assembly comprising a sand and water mixing component that also transports the sand and water from an inlet to an outlet.

4. The method of claim 3, comprising covering the pile of sand to reduce moisture loss during at least a portion of the predetermined period.

5. The method of claim 2, comprising determining a turbidity of the harvested sand.

6. The method of claim 2, comprising allowing the pile of wetted sand to rest for a predetermined period of more than 48 hours.

7. The method of claim 5, comprising allowing the pile of wetted sand to rest for a predetermined period of less than 72 hours.

8. The method of claim 6, comprising allowing the pile of wet sand to rest for a predetermined period of more than 72 hours.

9. The method of claim 2, comprising harvesting at least 50% of the pile after the predetermined period.

10. The method of claim 8, comprising harvesting at 90% or less of the pile after the predetermined period.

11. The method of claim 2, comprising wetting the harvested sand to raise its moisture content to between about 5% and about 40% by weight; creating a pile of the wetted sand; allowing the pile of wetted sand to rest for a predetermined period of more than 24 hours; harvesting after the predetermined period a portion of the pile having a turbidity less than turbidity of the harvested sand.

12. The method of claim 2, wherein creating the pile of sand comprises transporting the wet sand along a belt conveyor to a discharge end.

13. The method of claim 12, wherein the belt conveyor comprises a water spray system arranged to apply the water to the as-mined sand on the belt.

14. The method of claim 13, wherein the belt conveyor comprises a dewatering belt.

15. The method of claim 3, wherein the washing assembly discharges wet sand to a belt conveyor for creating the pile of wet sand.

16. The method of claim 15, wherein the belt conveyor comprises a dewatering belt.

17. The method of claim 16, wherein the belt conveyor comprises a water spray system arranged to apply additional water to wet sand on the belt.

18. The method of claim 1, wherein the water added to the as-mined sand does not create a sand-water slurry.

19. The method of claim 18, wherein the water added to the as-mined sand raises the moisture content of the as-mined sand by up to about 40% by weight.

20. The method of claim 1, further comprising removing non-sand debris and contaminants from the as-mined sand prior to or after wetting the sand.

\* \* \* \* \*